United States Patent
Hokuto et al.

(10) Patent No.: US 10,563,604 B2
(45) Date of Patent: Feb. 18, 2020

(54) CONTROL APPARATUS FOR INTERNAL COMBUSTION ENGINE

(71) Applicant: TOYOTA JIDOSHA KABUSHIKI KAISHA, Toyota-shi, Aichi (JP)

(72) Inventors: Hiroyuki Hokuto, Numazu (JP); Koichi Hoshi, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 33 days.

(21) Appl. No.: 15/513,600

(22) PCT Filed: Aug. 27, 2015

(86) PCT No.: PCT/JP2015/004317
§ 371 (c)(1),
(2) Date: Mar. 23, 2017

(87) PCT Pub. No.: WO2016/047042
PCT Pub. Date: Mar. 31, 2016

(65) Prior Publication Data
US 2017/0306872 A1    Oct. 26, 2017

(30) Foreign Application Priority Data
Sep. 26, 2014  (JP) ................. 2014-196813

(51) Int. Cl.
F02D 41/02   (2006.01)
F02D 41/12   (2006.01)
(Continued)

(52) U.S. Cl.
CPC ......... *F02D 41/025* (2013.01); *F02D 41/024* (2013.01); *F02D 41/0295* (2013.01);
(Continued)

(58) Field of Classification Search
CPC .. F02D 41/025; F02D 41/1454; F02D 41/123; F02D 41/0295; F02D 41/1446; F02D 41/00
See application file for complete search history.

(56) References Cited

U.S. PATENT DOCUMENTS

| | | | |
|---|---|---|---|
| 6,389,807 B1 * | 5/2002 | Suzuki | B60K 6/445 180/65.235 |
| 6,823,662 B1 * | 11/2004 | Yamamoto | B01D 53/8631 123/3 |
| 2002/0144500 A1 * | 10/2002 | Nakata | F01N 3/2046 60/277 |

(Continued)

FOREIGN PATENT DOCUMENTS

| | | |
|---|---|---|
| JP | 2002-371836 A | 12/2002 |
| JP | 2004-132185 A | 4/2004 |

OTHER PUBLICATIONS

International Search Report for application No. PCT/JP2015/004317 dated Jan. 4, 2016.

*Primary Examiner* — Hung Q Nguyen
*Assistant Examiner* — Brian P Monahon
(74) *Attorney, Agent, or Firm* — Sughrue Mion, PLLC

(57) ABSTRACT

A control apparatus for an internal combustion engine for adjusting an amount of air passing through a catalyst during fuel cut-off operation of the internal combustion engine, the temperature of the catalyst is caused to rise, when the fuel cut-off operation of the internal combustion engine is carried out in a state where the temperature of the catalyst is low. The apparatus is constructed such that in cases where the fuel cut-off operation is carried out in a state where the temperature of the catalyst is relatively low but equal to or higher than an activation temperature thereof, the amount of air passing through the catalyst is made larger in a period of time in which the catalyst becomes a rich atmosphere immediately after the start of the fuel cut-off operation, in comparison with a subsequent period of time in which the catalyst becomes a lean atmosphere.

3 Claims, 6 Drawing Sheets

(51) Int. Cl.
  *F02D 41/14*     (2006.01)
  *F02D 41/00*     (2006.01)

(52) U.S. Cl.
  CPC ....... *F02D 41/123* (2013.01); *F02D 41/1446* (2013.01); *F02D 41/1454* (2013.01); *F02D 41/00* (2013.01); *Y02T 10/26* (2013.01)

(56) References Cited

U.S. PATENT DOCUMENTS

| | | | | |
|---|---|---|---|---|
| 2004/0060535 | A1* | 4/2004 | Osawa | B60K 6/445 |
| | | | | 123/198 DB |
| 2007/0095051 | A1* | 5/2007 | Iihoshi | F01N 11/007 |
| | | | | 60/277 |
| 2007/0156322 | A1* | 7/2007 | Soga | F02D 41/16 |
| | | | | 701/104 |
| 2007/0250250 | A1* | 10/2007 | Yoshioka | F02D 41/0005 |
| | | | | 701/104 |
| 2007/0266991 | A1* | 11/2007 | Yoshioka | F01N 3/101 |
| | | | | 123/339.1 |
| 2009/0120699 | A1* | 5/2009 | Suzuki | B60L 15/2045 |
| | | | | 180/65.265 |
| 2011/0179774 | A1* | 7/2011 | Iihoshi | F02D 41/0085 |
| | | | | 60/276 |
| 2012/0060479 | A1* | 3/2012 | Tsukamoto | F02D 41/0005 |
| | | | | 60/278 |
| 2012/0060805 | A1* | 3/2012 | Nakano | F02D 41/0235 |
| | | | | 123/703 |
| 2012/0324869 | A1* | 12/2012 | Nakamura | F01N 11/007 |
| | | | | 60/276 |
| 2013/0226436 | A1* | 8/2013 | Morita | F02D 19/084 |
| | | | | 701/103 |
| 2014/0283504 | A1* | 9/2014 | Fujiwara | F02D 41/0295 |
| | | | | 60/286 |

* cited by examiner

[Fig. 1]
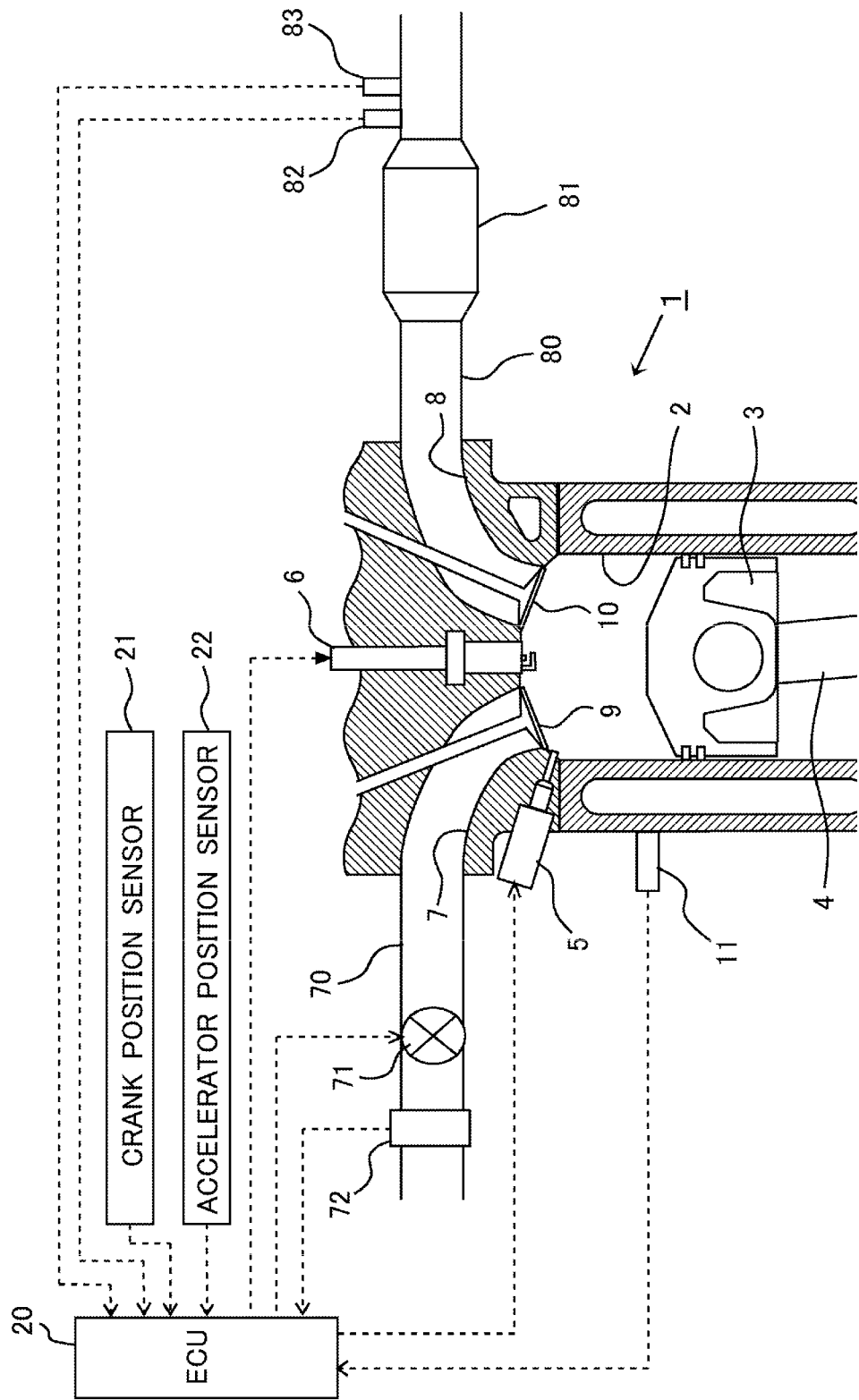

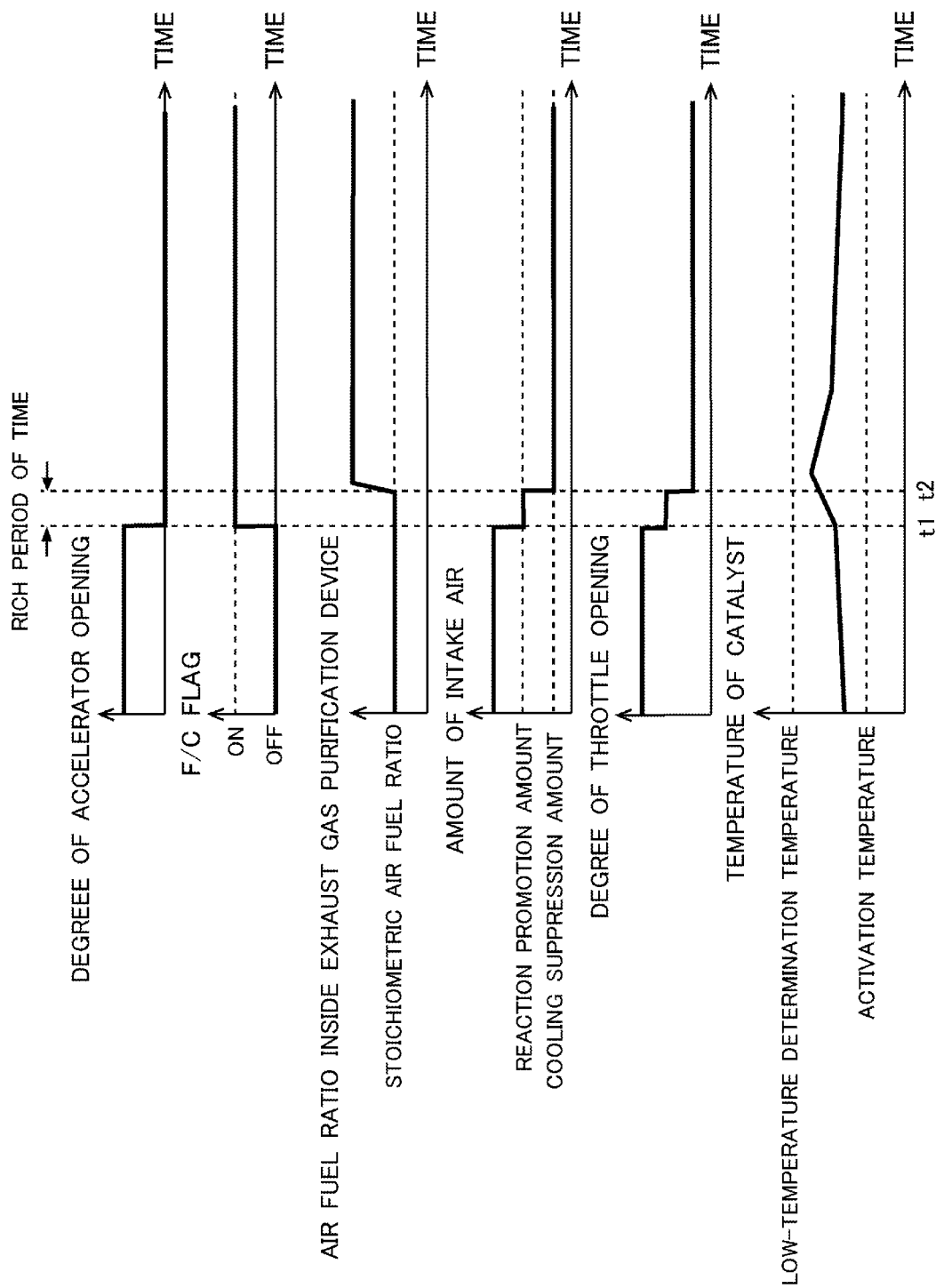
[Fig. 2]

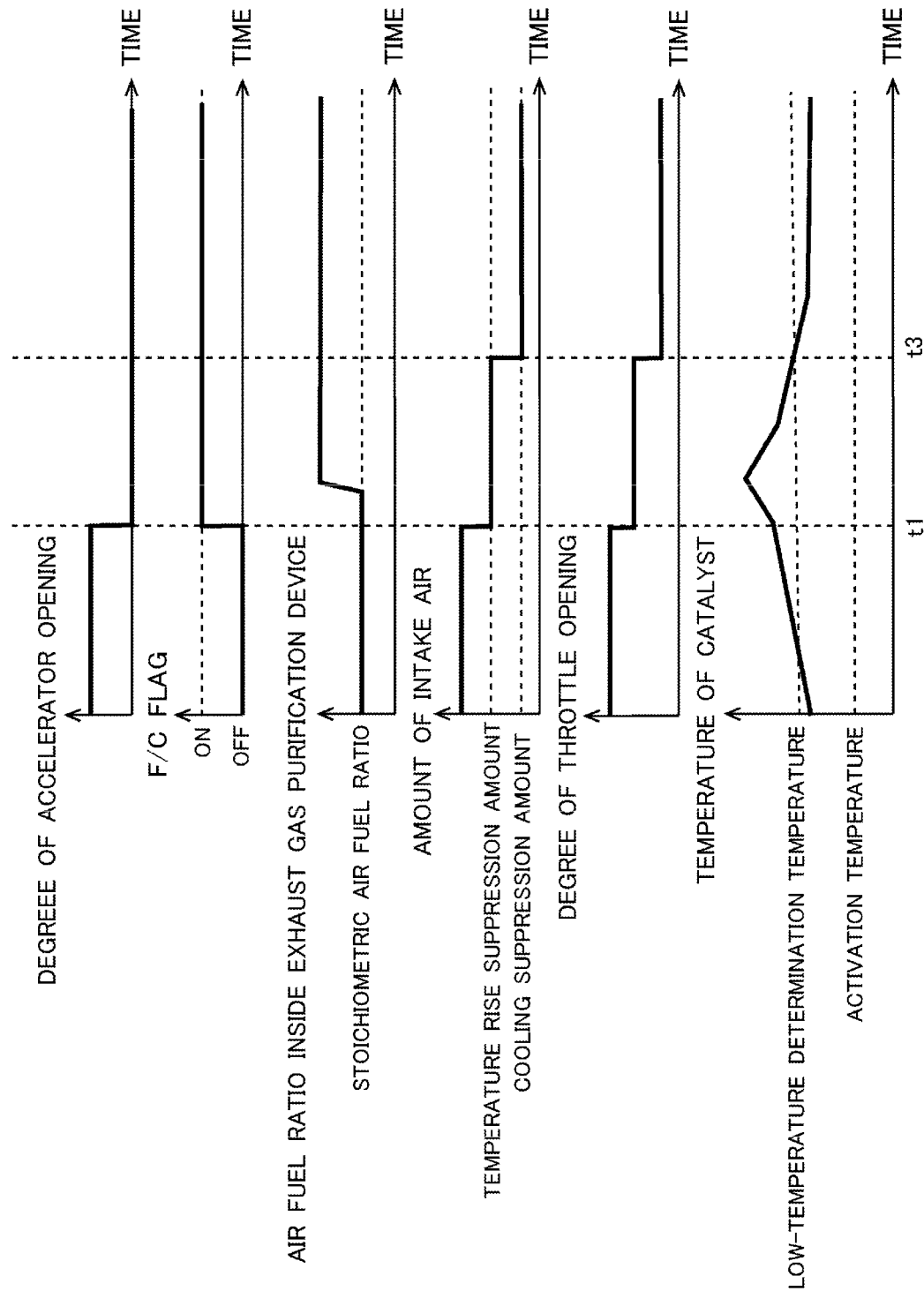
[Fig. 3]

[Fig. 4]
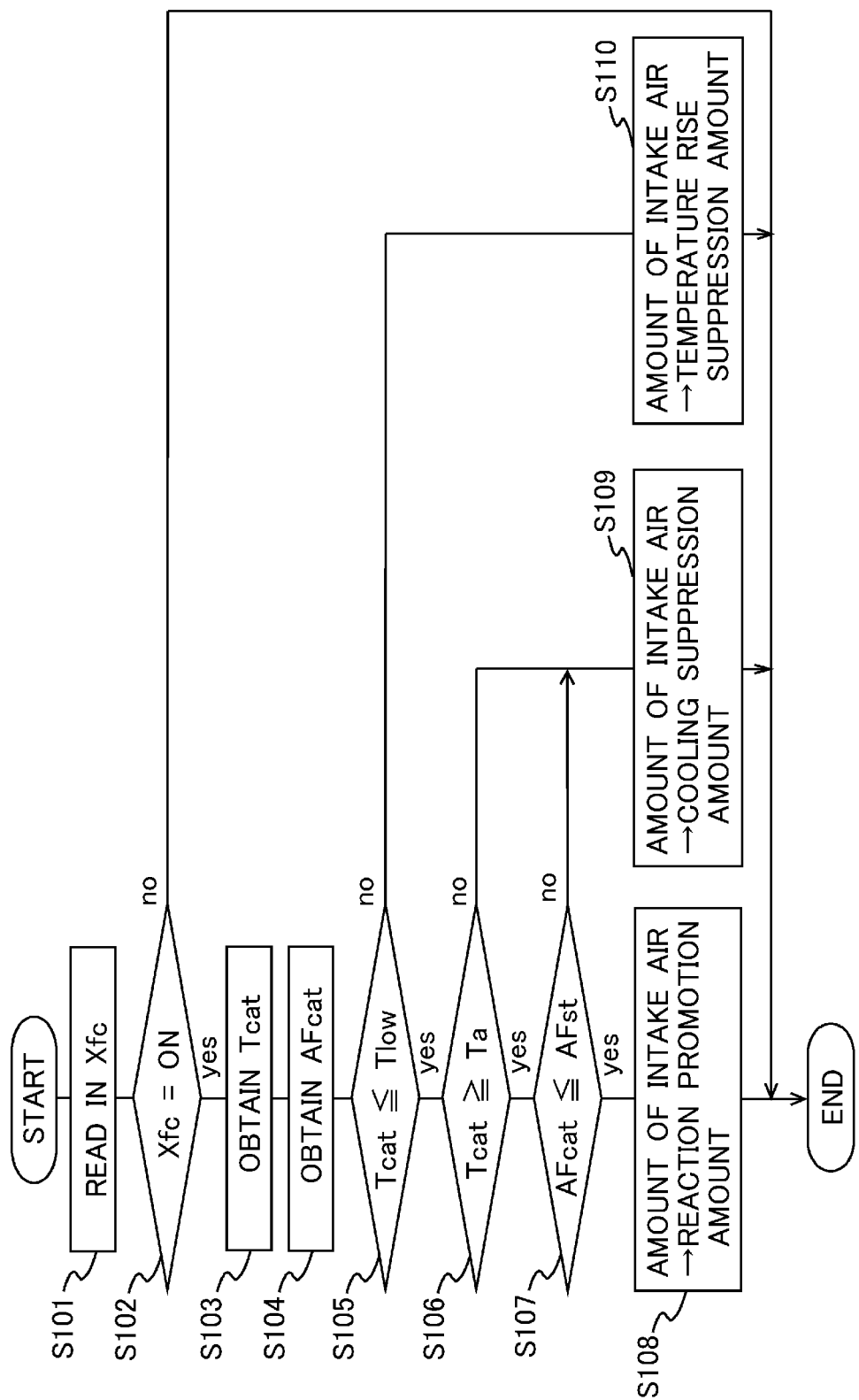

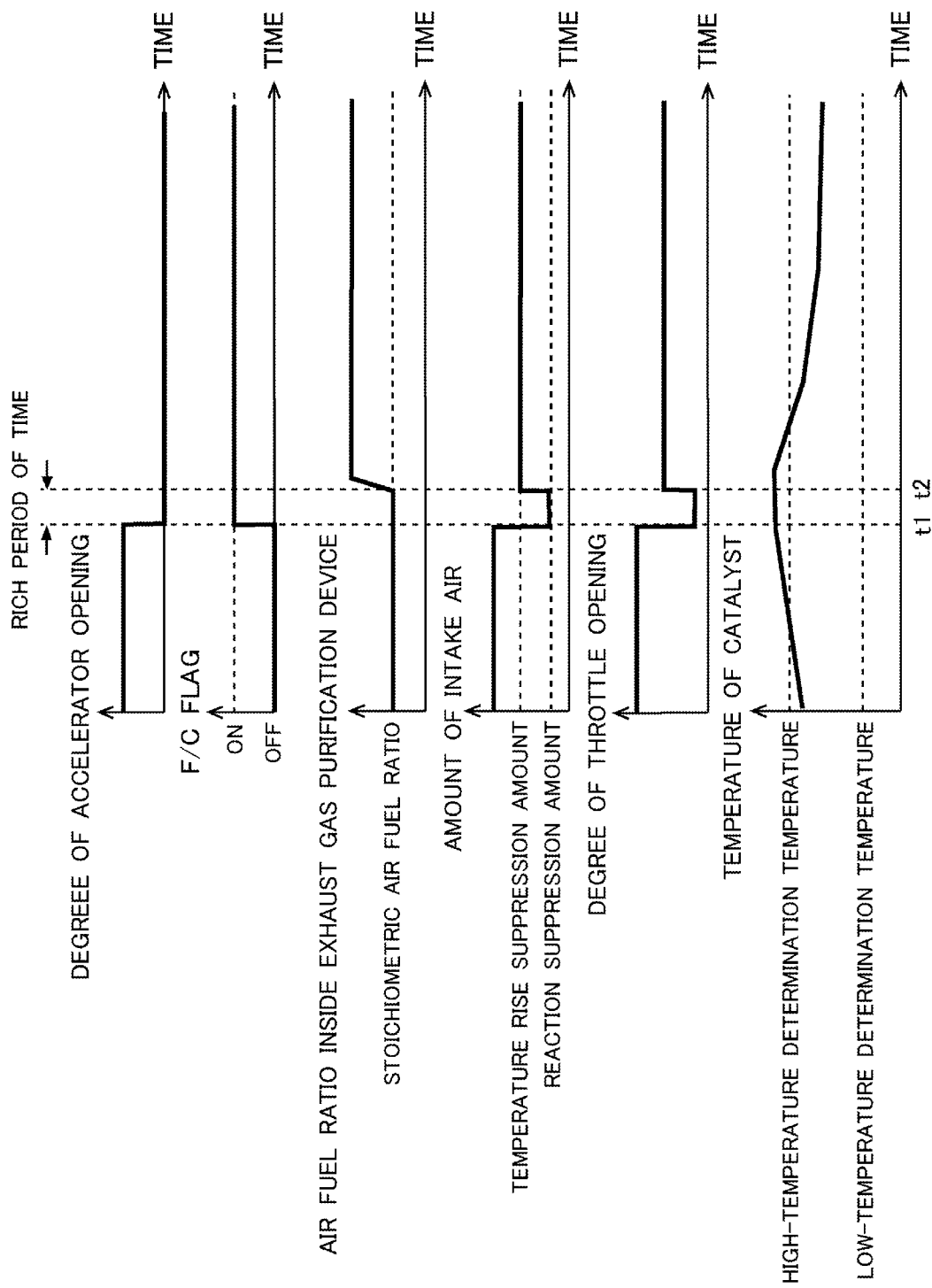
[Fig. 5]

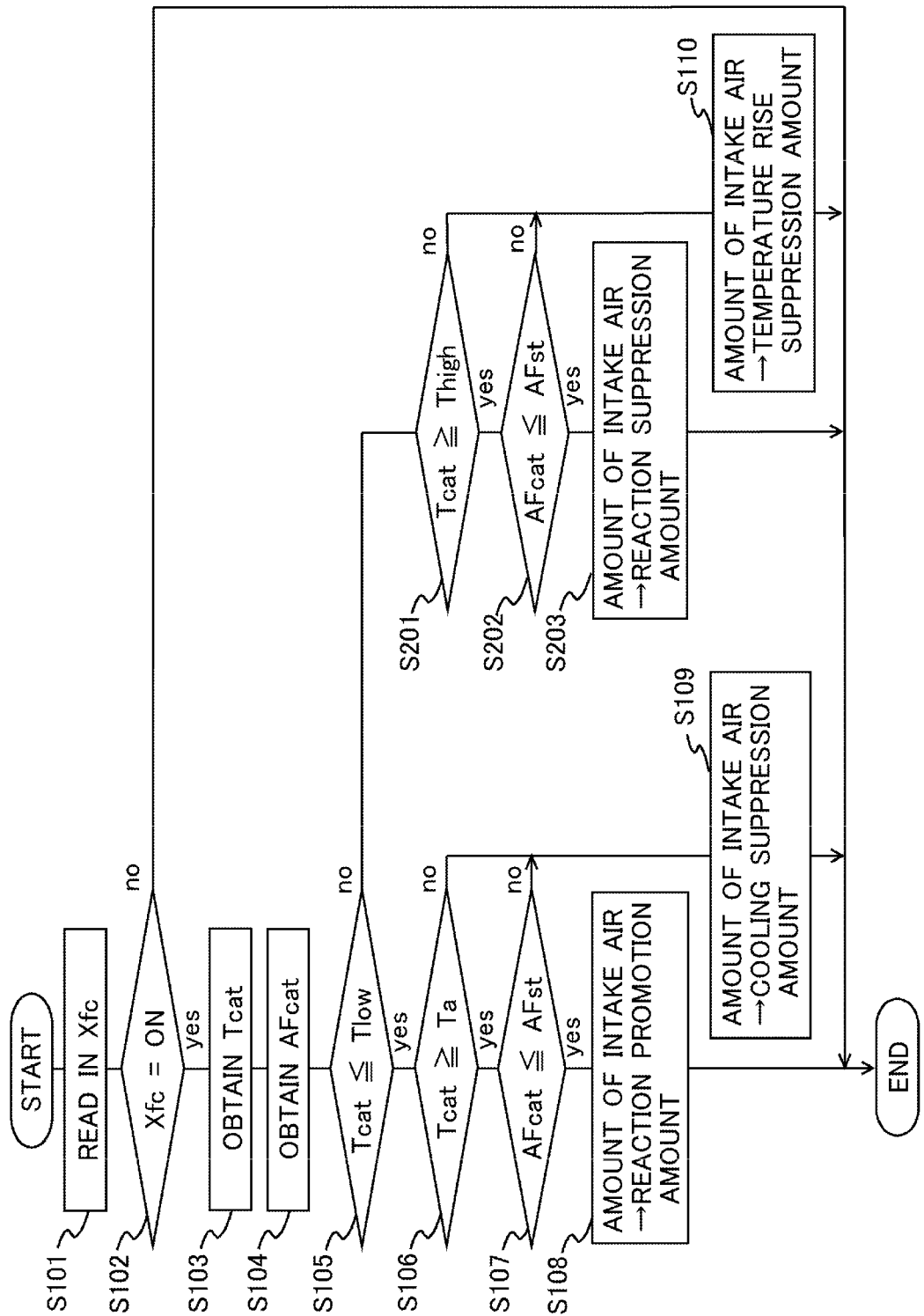
[Fig. 6]

CONTROL APPARATUS FOR INTERNAL COMBUSTION ENGINE

CROSS REFERENCE TO RELATED APPLICATIONS

This application is a National Stage of International Application No. PCT/JP2015/004317, filed on Aug. 27, 2015, which claims priority from Japanese Patent Application No. 2014-196813, filed on Sep. 26, 2014, the contents of all of which are incorporated herein by reference in their entirety.

TECHNICAL FIELD

The present invention relates to a control apparatus for an internal combustion engine, and in particular, to a technology to adjust an amount of air passing through a catalyst during fuel cut-off operation of the internal combustion engine.

BACKGROUND ART

There is known a technology in which in an arrangement where a catalyst is disposed in an exhaust passage of an internal combustion engine, when the internal combustion engine is driven in a fuel cut-off operation, an amount of gas (an amount of air) passing through the catalyst is made to increase, thereby suppressing an excessive rise in the temperature of the catalyst. In addition, there is also known a technology in which in the case where the fuel cut-off operation of the internal combustion engine is carried out, when the temperature of the catalyst is low, the amount of air passing through the catalyst is made to decrease, thereby suppressing excessive cooling of the catalyst (for example, see a first patent literature).

CITATION LIST

Patent Literature

Patent Literature 1: Japanese patent laid-open publication No. 2004-132185
Patent Literature 2: Japanese patent laid-open publication No. 2002-371836

SUMMARY OF INVENTION

Technical Problem

However, in the case where the fuel cut-off operation of the internal combustion engine is carried out in a state where the temperature of the catalyst is low, even if the amount of air passing through the catalyst is decreased, it may become difficult to maintain the catalyst in an activated state.

The present invention has been made in view of the actual circumstances as referred to above, and has for its object to provide a technology in which in a control apparatus for an internal combustion engine which serves to adjust an amount of air passing through a catalyst during fuel cut-off operation of the internal combustion engine, the catalyst can be maintained in an activated state, when the fuel cut-off operation of the internal combustion engine is carried out in a state where the temperature of the catalyst is low.

Solution to Problem

In solving the above-mentioned problem, the inventors of the present invention have focused on the following fact: in the case where a catalyst having an oxygen storage ability is disposed in an exhaust passage of an internal combustion engine, when fuel cut-off operation of the internal combustion engine is carried out, the catalyst becomes an atmosphere in which the air fuel ratio is equal to or less than a stoichiometric air fuel ratio (hereinafter, referred to as a "rich atmosphere"), immediately after the start of the fuel cut-off operation, and thereafter becomes an atmosphere in which the air fuel ratio is higher than the stoichiometric air fuel ratio (hereinafter, referred to as a "lean atmosphere"). Then, in cases where the fuel cut-off operation is carried out in a state where the temperature of the catalyst is in a relatively low temperature range which is equal to or higher than an activation temperature thereof, the amount of air passing through the catalyst is made to be larger in a period of time in which the catalyst becomes a rich atmosphere immediately after the start of the fuel cut-off operation, in comparison with a subsequent period of time in which the catalyst becomes a lean atmosphere.

Specifically, according to the present invention, there is provided a control apparatus for an internal combustion engine in which in an exhaust passage, there is disposed a catalyst having an oxygen storage ability in which oxygen is stored when an air fuel ratio of exhaust gas is a lean air fuel ratio higher than a stoichiometric air fuel ratio, whereas oxygen is released when the air fuel ratio of exhaust gas is a rich air fuel ratio lower than the stoichiometric air fuel ratio, said apparatus comprising:

an estimation unit configured to estimate the air fuel ratio of the exhaust gas in said catalyst;

an obtaining unit configured to obtain a temperature of said catalyst;

an adjustment unit configured to adjust an amount of air passing through said catalyst to a predetermined cooling suppression amount, when the temperature obtained by said obtaining unit is equal to or less than a predetermined low-temperature determination temperature which is higher than an activation temperature of said catalyst, in a period of time in which the internal combustion engine is driven in a fuel cut-off operation; and a correction unit configured to increase the amount of air passing through said catalyst from said cooling suppression amount, when the temperature obtained by said obtaining unit is equal to or higher than the activation temperature of said catalyst, during a period of time from a point in time at which the fuel cut-off operation is started until a point in time at which the air fuel ratio estimated by said estimation unit changes from an air fuel ratio equal to or less than the stoichiometric air fuel ratio to a lean air fuel ratio, in the case where the amount of air passing through said catalyst is adjusted to said cooling suppression amount by said adjustment unit.

The "low-temperature determination temperature" referred to herein is a temperature at which in cases where the fuel cut-off operation of the internal combustion engine is carried out at the time where the temperature of the catalyst is equal to or lower than said low-temperature determination temperature, when the low-load operation of the internal combustion engine is carried out during the fuel cut-off operation or after the end of the fuel cut-off operation, it can be assumed that the temperature of the catalyst may drop to less than the activation temperature. This low-temperature determination temperature has been beforehand obtained experimentally. In addition, the "cooling suppression amount" is an amount which is set in such a manner that the amount of heat carried away from the catalyst with the air passing through the catalyst becomes a minimum, and it has been beforehand decided by adaptation work making use of experiments, etc.

While the fuel cut-off operation of the internal combustion engine is carried out, the air sucked into a cylinder is discharged out of the cylinder, without being supplied for combustion. For that reason, the gas flowing into the catalyst during a period of time of the fuel cut-off operation contains only air. However, immediately after the start of the fuel cut-off operation, a mixed gas containing air and gas (burnt gas) combusted in the cylinder immediately before the start of the fuel cut-off operation flows into the catalyst. In that case, oxygen in the mixed gas is stored in the catalyst, so that the atmosphere of the catalyst becomes a rich atmosphere (i.e., the air fuel ratio of the exhaust gas inside the catalyst is the stoichiometric air fuel ratio or a rich air fuel ratio). Then, when the oxygen storage ability of the catalyst is saturated, the atmosphere of the catalyst changes from the rich atmosphere to a lean atmosphere (i.e., the air fuel ratio of the exhaust gas inside the catalyst changes from the air fuel ratio equal to or less than the stoichiometric air fuel ratio to a lean air fuel ratio).

Here, in the case where the catalyst immediately after the start of the fuel cut-off operation is exposed to the rich atmosphere, when the catalyst has been activated, hydrocarbon (HC) and carbon monoxide (CO) contained in the mixed gas are made to react with oxygen ($O_2$) under the action of the catalyst (oxidation reaction), so that the catalyst is heated by the heat of reaction generated. On the other hand, after the atmosphere of the catalyst has changed from the rich atmosphere to the lean atmosphere, the oxidation reaction as mentioned above will not substantially occur, and the heat of the catalyst will be carried away with the air passing through the catalyst.

Accordingly, in the case where the amount of air passing through said catalyst is adjusted to the cooling suppression amount by means of the adjustment unit, when the temperature of the catalyst obtained by the obtaining unit is equal to or higher than the activation temperature thereof during the period of time (hereinafter, referred to as "a rich period of time") from the point in time at which the fuel cut-off operation is started until the point in time at which the air fuel ratio estimated by the estimation unit changes from the air fuel ratio equal to or less than the stoichiometric air fuel ratio to the lean air fuel ratio, and when the amount of air passing through the catalyst is made more than the cooling suppression amount, the amount of oxygen flowing into the catalyst per unit time increases. As the amount of oxygen flowing into the catalyst per unit time increases, the amount of oxidation reaction heat generated per unit time also increases. As a result, the heating of the catalyst by the heat of oxidation reaction becomes prevalent with respect to the carrying away of heat by the air passing through the catalyst, so that the amount of rise in the temperature of the catalyst during the rich period of time increases. In addition, after the lapse of the rich period of time, the amount of air passing through the catalyst is decreased to the predetermined cooling suppression amount, so the amount of heat carried away from the catalyst with the air passing through the catalyst is suppressed to a minimum, thereby decreasing the amount of drop in the temperature of the catalyst.

Accordingly, according to the control apparatus for an internal combustion engine of the present invention, in cases where the fuel cut-off operation of the internal combustion engine is carried out in the state where the temperature of the catalyst is low, it becomes difficult for the temperature of the catalyst to drop to less than the activation temperature at the time of the low-load operation during the fuel cut-off operation or after the end of the fuel cut-off operation.

Here, note that when the temperature of the catalyst is higher than said low-temperature determination temperature, in the period of time in which the fuel cut-off operation of the internal combustion engine is carried out, said adjustment unit may adjust the amount of air passing through the catalyst to a predetermined temperature rise suppression amount. The "temperature rise suppression amount" referred to herein is an amount which is larger than said cooling suppression amount, and which is set in such a manner that the amount of heat carried away from the catalyst with the air passing through the catalyst becomes as much as possible, and it has been beforehand obtained by adaptation work making use of experiments, etc.

However, when the amount of air passing through the catalyst is adjusted to the temperature rise suppression amount in the case where the fuel cut-off operation of the internal combustion engine is carried out in a state where the temperature of the catalyst is sufficiently higher than said low-temperature determination temperature, the amount of rise in the temperature of the catalyst in said rich period of time increases, so the temperature of the catalyst may rise to an excessive extent during the fuel cut-off operation.

In contrast to this, the correction unit of the present invention may decrease the amount of air passing through said catalyst to a value smaller than said temperature rise suppression amount, when the temperature of the catalyst obtained by said obtaining unit is equal to or higher than a predetermined high-temperature determination temperature, during the period of time (the rich period of time) from the point in time at which the fuel cut-off operation is started until the point in time at which the air fuel ratio estimated by said estimation unit changes from the air fuel ratio equal to or less than the stoichiometric air fuel ratio to the lean air fuel ratio, in the case where the amount of air passing through said catalyst is adjusted to said temperature rise suppression amount by said adjustment unit. The "high-temperature determination temperature" referred to herein is a temperature which is sufficiently high as compared with said low-temperature determination temperature, and which can be assumed that the temperature of the catalyst may rise to an excessive extent during the fuel cut-off operation, when the fuel cut-off operation of the internal combustion engine is carried out in a state where the temperature of the catalyst is higher than said high-temperature determination temperature. This high-temperature determination temperature has been beforehand obtained experimentally.

According to such a configuration, in cases where the fuel cut-off operation of the internal combustion engine is carried out in a state where the temperature of the catalyst is sufficiently high, as compared with the low-temperature determination temperature, it is possible to make slow the rate of oxidation reaction during the rich period of time. For that reason, the amount of rise in the temperature of the catalyst in the rich period of time can be suppressed small, so that the temperature of the catalyst becomes difficult to rise to an excessive extent during the fuel cut-off operation of the internal combustion engine.

Here, in cases where a measuring device (e.g., an oxygen concentration sensor or an air fuel ratio sensor) for measuring a physical quantity (e.g., an oxygen concentration or an air fuel ratio) correlated with the air fuel ratio of the exhaust gas is disposed in the exhaust passage at the downstream side of the catalyst, the estimation unit may estimate the air fuel ratio of the exhaust gas (atmosphere) inside the catalyst, by assuming that the air fuel ratio measured by the measuring device is equal to the air fuel ratio of the exhaust gas inside the catalyst.

In addition, the estimation unit may estimate the air fuel ratio of the exhaust gas inside the catalyst, by using as parameters an amount of oxygen flowing into the catalyst after the start of the fuel cut-off operation (a multiplied value of the amount of intake air and the concentration of the oxygen contained in the air) and an oxygen storage capacity of the catalyst. For example, the amount of oxygen flowing into the catalyst may be integrated from the point in time at which the fuel cut-off operation was started, and in a period of time until the integrated value thus obtained reaches the oxygen storage capacity of the catalyst, it may be estimated that the air fuel ratio of the exhaust gas inside the catalyst is equal to or less than the stoichiometric air fuel ratio.

Advantageous Effects of Invention

According to the present invention, in a control apparatus for an internal combustion engine which serves to adjust an amount of air passing through a catalyst during fuel cut-off operation of the internal combustion engine, it is possible to raise the temperature of the catalyst in an appropriate and suitable manner, when the fuel cut-off operation of the internal combustion engine is carried out in a state where the temperature of the catalyst is low.

BRIEF DESCRIPTION OF DRAWINGS

FIG. 1 is a view showing the schematic construction of an internal combustion engine with its intake and exhaust systems to which the present invention is applied.

FIG. 2 is a timing chart showing a method for adjusting an amount of intake air in cases where fuel cut-off operation of the internal combustion engine is carried out in a state where the temperature of a catalyst becomes equal to or lower than a low-temperature determination temperature.

FIG. 3 is a flow chart showing a method for adjusting the amount of intake air in cases where the fuel cut-off operation of the internal combustion engine is carried out in a state where the temperature of the catalyst becomes higher than the low-temperature determination temperature.

FIG. 4 is a flow chart showing a processing routine which is executed by an ECU in cases where the fuel cut-off operation of the internal combustion engine is carried out, in a first embodiment of the present invention.

FIG. 5 is a timing chart showing a method for adjusting an amount of intake air in cases where the fuel cut-off operation of the internal combustion engine is carried out in a state where the temperature of the catalyst becomes equal to or higher than a high-temperature determination temperature.

FIG. 6 is a flow chart showing a processing routine which is executed by an ECU in cases where the fuel cut-off operation of the internal combustion engine is carried out, in a second embodiment of the present invention.

DESCRIPTION OF EMBODIMENTS

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

Embodiment 1

First, reference will be made to a first embodiment of the present invention based on FIGS. 1 through 4. FIG. 1 is a view showing the schematic construction of an internal combustion engine 1 and its intake and exhaust systems, to which the present invention is applied. The internal combustion engine 1 shown in FIG. 1 is a spark ignition type internal combustion engine (gasoline engine) having a plurality of cylinders. Here, note that in FIG. 1, only one cylinder among the plurality of cylinders is illustrated.

A piston 3 is fitted in each cylinder 2 of the internal combustion engine 1 for sliding movement relative thereto. The piston 3 is connected with an unillustrated engine output shaft (crankshaft) through a connecting rod 4. On each cylinder 2, there are mounted a fuel injection valve 5 for injecting fuel into the cylinder 2 and a spark plug 6 for generating a spark in the cylinder 2.

The inside of each cylinder 2 is in communication with an intake port 7 and an exhaust port 8. An open end of the intake port 7 in each cylinder 2 is opened and closed by means of an intake valve 9. An open end of the exhaust port 8 in each cylinder 2 is opened and closed by means of an exhaust valve 10. The intake valve 9 and the exhaust valve 10 are driven to open and close by means of an unillustrated intake cam and an unillustrated exhaust cam, respectively.

The intake port 7 is in communication with an intake passage 70. A throttle valve 71 is arranged in the intake passage 70. An air flow meter 72 is arranged in the intake passage 70 at a location upstream of the throttle valve 71.

The exhaust port 8 is in communication with an exhaust passage 80. An exhaust gas purification device 81 is arranged in the exhaust passage 80. The exhaust gas purification device 81 receives at least a catalyst having an oxidation function (e.g., a three-way catalyst, an NOx storage reduction catalyst, an oxidation catalyst, or the like) in a cylindrical casing. Here, note that the catalyst received in the exhaust gas purification device 81 has an oxygen storage ability which stores oxygen when the air fuel ratio of the exhaust gas is a lean air fuel ratio higher than a stoichiometric air fuel ratio, and releases oxygen when the fuel ratio of the exhaust gas is a rich air fuel ratio lower than the stoichiometric air fuel ratio.

In the internal combustion engine 1 constructed in this manner, there is arranged in combination therewith an ECU (Electronic Control Unit) 20 for controlling the internal combustion engine 1. The ECU 20 is an electronic control unit which is composed of a CPU, a ROM, a RAM, a backup RAM, and so on. Detection signals of various sensors, such as a water temperature sensor 11, a crank position sensor 21, an accelerator position sensor 22, an exhaust gas temperature sensor 82, an air fuel ratio sensor (A/F sensor) 83, and so on, in addition to a detection signal of the above-mentioned air flow meter 72, are input to the ECU 20.

The air flow meter 72 outputs an electrical signal correlated with an amount (mass) of intake air flowing in the intake passage 70. The water temperature sensor 11 outputs an electrical signal correlated with the temperature of cooling water circulating in the internal combustion engine 1. The crank position sensor 21 outputs an electrical signal correlated with the rotational position of the crankshaft of the internal combustion engine 1. The accelerator position sensor 22 outputs an electric signal correlated with an amount of operation of an unillustrated accelerator pedal (i.e., a degree of accelerator opening). The exhaust gas temperature sensor 82 is arranged in the exhaust passage 80 at a location downstream of the exhaust gas purification device 81, and outputs an electrical signal correlated with the temperature of the exhaust gas flowing out of the exhaust gas purification device 81. The air fuel ratio sensor 83 is arranged in the exhaust passage 80 at a location downstream of the exhaust gas purification device 81, and outputs an electrical signal correlated with the air fuel ratio of the exhaust gas flowing out of the exhaust gas purification device 81.

The ECU 20 is electrically connected to a variety of kinds of equipment such as the fuel injection valve 5, the spark plug 6, the throttle valve 71, etc., and controls the variety of kinds of equipment based on the output signals of the above-mentioned variety of kinds of sensors. For example, the ECU 20 carries out known control, such as fuel injection control, etc., according to an operating state of the internal combustion engine 1 specified by the output signals of the crank position sensor 21, the accelerator position sensor 22, the air flow meter 72, and so on. In addition, the ECU 20 carries out air amount adjustment processing to adjust the amount of air passing through the exhaust gas purification device 81 during the fuel cut-off operation of the internal combustion engine 1. In the following, a method of carrying out the air amount adjustment processing in this embodiment will be described.

When the engine rotation speed calculated from the output signal of the crank position sensor 21 is equal to or more than a predetermined engine rotation speed, and when the accelerator opening degree specified from the output signal of the accelerator position sensor 22 is zero, the ECU 20 causes the internal combustion engine 1 to perform the fuel cut-off operation by stopping the operation (fuel injection) of the fuel injection valves 5 in all the cylinders 2. When the accelerator opening degree becomes large than zero, or when the engine rotation speed becomes equal to or less than a predetermined threshold value, such a fuel cut-off operation is ended, and the operation of the fuel injection valves 5 is resumed.

In addition, during the fuel cut-off operation of the internal combustion engine 1, the ECU 20 controls the throttle valve 71 in such a manner that the amount of intake air in the internal combustion engine 1 becomes equal to or more than a predetermined lower limit value, and at the same time, equal to or less than a predetermined upper limit value. The "lower limit value" referred to herein is, for example, a minimum amount of intake air in which an amount of oil sucked into a cylinder 2 due to an increase of negative pressure (a decrease of pressure) in the cylinder accompanying a decrease in the amount of intake air falls below a permissible amount. On the other hand, the "upper limit value" is, for example, a maximum amount of intake air in which a sufficient negative pressure can be supplied to an unillustrated brake booster from the intake passage 70 downstream of the throttle valve 71, or a maximum amount of intake air in which engine brake can be secured.

Specifically, when the temperature of the catalyst received in the exhaust gas purification device 81 is equal to or lower than a predetermined low-temperature determination temperature in the period of time in which the fuel cut-off operation of the internal combustion engine 1 is carried out, the ECU 20 controls the throttle valve 71 in such a manner that the amount of intake air in the internal combustion engine 1 becomes a predetermined cooling suppression amount.

The "low-temperature determination temperature" referred to herein is a temperature which is higher than an activation temperature (e.g., 400 degrees C.) of the catalyst, and which is considered that in cases where the fuel cut-off operation of the internal combustion engine 1 is carried out in a state where the temperature of the catalyst is lower than the low-temperature determination temperature, and in cases where the amount of intake air during the period of time of the fuel cut-off operation is made more than the cooling suppression amount, when the low-load operation of the internal combustion engine 1 is carried out during the fuel cut-off operation or after the end of the fuel cut-off operation, the temperature of the catalyst in the exhaust gas purification device 81 may drop to less than the activation temperature thereof. This low-temperature determination temperature is a temperature (e.g., about 600 degrees C.) which has been obtained experimentally in advance.

In addition, the "cooling suppression amount" is an amount which is decided in such a manner that the amount of heat carried away from the catalyst with the air passing through the exhaust gas purification device 81 during the fuel cut-off operation of the internal combustion engine 1 becomes as small as possible, and which may be set, for example, to said lower limit value (the minimum amount of intake air in which the amount of oil sucked into a cylinder 2 due to an increase of negative pressure in the cylinder 2 accompanying a decrease in the amount of intake air falls below the permissible amount), or an amount equal to a sum of the lower limit value and a predetermined margin.

During the fuel cut-off operation of the internal combustion engine 1, the air sucked into a cylinder 2 is discharged out of the cylinder 2, without being supplied for combustion. For that reason, the gas flowing into the exhaust gas purification device 81 during the period of time of the fuel cut-off operation is a gas of low temperature and lean atmosphere containing only air. Accordingly, when the amount of intake air during the period of time of the fuel cut-off operation is limited to said cooling suppression amount, the amount of heat, which is carried away from the catalyst by the air passing through the exhaust gas purification device 81, can be suppressed to a minimum.

However, immediately after the fuel cut-off operation has been started, a mixed gas containing air and gas (burnt gas) combusted in the cylinder 2 immediately before the fuel cut-off operation is started flows into the exhaust gas purification device 81. At that time, the oxygen in the mixed gas is stored by the catalyst of the exhaust gas purification device 81, so the interior of the exhaust gas purification device 81 becomes a rich atmosphere equal to or less than the stoichiometric air fuel ratio. Then, when the oxygen storage ability of the catalyst is saturated, the interior of the exhaust gas purification device 81 will change from the rich atmosphere to a lean atmosphere.

Here, when the exhaust gas purification device 81 has been activated in the case where the catalyst immediately after the start of the fuel cut-off operation is exposed to the rich atmosphere, hydrocarbon (HC) and carbon monoxide (CO) contained in the mixed gas are made to react with oxygen ($O_2$) under the action of the catalyst (oxidation reaction), so that the catalyst is heated by the heat of reaction generated. On the other hand, after the atmosphere of the catalyst has changed from the rich atmosphere to the lean atmosphere, the oxidation reaction as mentioned above will not substantially occur, and the heat of the catalyst will be carried away with the air passing through the exhaust gas purification device 81.

Accordingly, in this embodiment, in cases where the fuel cut-off operation of the internal combustion engine 1 is carried out in a state where the temperature of the catalyst received in the exhaust gas purification device 81 becomes equal to or less than the low-temperature determination temperature, when the temperature of the catalyst is equal to or higher than the activation temperature thereof, in a period of time (a rich period of time) from a point in time (t1 in FIG. 2) at which the fuel cut-off flag (F/C flag) is turned on until a point in time (t2 in FIG. 2) at which the air fuel ratio of the exhaust gas in the exhaust gas purification device 81 changes from an air fuel ratio equal to or less than the stoichiometric air fuel ratio to a lean air fuel ratio, as shown in FIG. 2, the throttle valve 71 is controlled so as to make the amount of intake air in the internal combustion engine 1 equal to a predetermined reaction promotion amount which is more than an amount of intake air (cooling suppression amount) after the lapse of the rich period of time. Then, in a period of time from the end time point (t2 in FIG. 2) of the rich period of time until the F/C flag is turned off, the throttle valve 71 is controlled so as to make the amount of intake air in the internal combustion engine 1 equal to the cooling suppression amount.

Here, note that the rate of the oxidation reaction occurring in the catalyst during the rich period of time becomes faster (larger) in accordance with the increasing amount of oxygen supplied to the catalyst per unit time. For that reason, it is preferable that the amount of intake air during the rich period of time be as much as possible. Accordingly, the "reaction promotion amount" referred to herein may be set to the above-mentioned upper limit value (the maximum amount of intake air in which a sufficient negative pressure can be supplied to the unillustrated brake booster from the intake passage 70 downstream of the throttle valve 71, or the maximum amount of intake air in which engine brake can be secured), or an amount which is obtained by subtracting a margin from the upper limit value.

When the amount of intake air during the fuel cut-off operation is adjusted in this manner, the amount of air flowing into the exhaust gas purification device 81 during the rich period of time becomes more than the cooling suppression amount, thus making it possible to speed up the rate of the oxidation reaction occurring in the catalyst during the rich period of time. As a result, the amount of rise in temperature of the catalyst in the rich period of time can be increased. In addition, after the lapse of the rich period of time, the amount of air flowing into the exhaust gas purification device 81 is decreased to the predetermined cooling suppression amount, so the amount of heat carried away from the catalyst with the air passing through the exhaust gas purification device 81 can be suppressed to a minimum, thereby making it possible to suppress the amount of drop in the temperature of the catalyst to a minimum.

Accordingly, even in cases where the fuel cut-off operation of the internal combustion engine 1 is carried out in a state where the temperature of the catalyst is low, the temperature of the catalyst becomes difficult to drop to less than the activation temperature thereof, at the time of the low-load operation of the internal combustion engine during the fuel cut-off operation or after the end of the fuel cut-off operation, as a result of which the catalyst can be maintained in an activated state.

Here, note that the F/C flag in FIG. 2 is turned on when the engine rotation speed is equal to or more than the predetermined engine rotation speed and when the accelerator opening degree is zero, whereas it is turned off when the engine rotation speed drops to less than the predetermined engine rotation speed, or when the accelerator opening degree becomes larger than zero. Then, it is assumed that when the F/C flag is on, the operation of the fuel injection valves 5 and the spark plugs 6 in all the cylinders 2 is stopped by means of the ECU 20.

On the other hand, in cases where the fuel cut-off operation of the internal combustion engine 1 is carried out in a state where the temperature of the catalyst received in the exhaust gas purification device 81 becomes higher than the above-mentioned low-temperature activation temperature, the throttle valve 71 is controlled so as to make the amount of intake air in the internal combustion engine 1 equal to a predetermined temperature rise suppression amount (t1 in FIG. 3), when the F/C flag has been turned on, as shown in FIG. 3.

The "temperature rise suppression amount" referred to herein is an amount which is more than the above-mentioned cooling suppression amount, and which is decided in such a manner that the amount of heat carried away from the catalyst with the air passing through the exhaust gas purification device 81 becomes as much as possible. For example, the temperature rise suppression amount may be set to the above-mentioned upper limit value (the maximum amount of intake air in which a sufficient negative pressure can be supplied to the unillustrated brake booster from the intake passage 70 downstream of the throttle valve 71, or the maximum amount of intake air in which engine brake can be secured), or an amount which is obtained by subtracting a predetermined margin from the upper limit value.

As long as the temperature of the catalyst becomes higher than the low-temperature activation temperature, the state where the amount of intake air in the internal combustion engine 1 is made equal to the temperature rise suppression amount is continued until the F/C flag changes from on to off. However, in cases where the temperature of the catalyst has dropped to a temperature equal to or lower than the low-temperature determination temperature before the F/C flag changes from on to off, the amount of intake air in the internal combustion engine 1 is made to decrease from the above-mentioned temperature rise suppression amount to the cooling suppression amount, at a point in time at which the temperature of the catalyst becomes equal to or lower than the low-temperature determination temperature (t4 in FIG. 3).

In the case where the amount of intake air during the fuel cut-off operation is adjusted in this manner, when the temperature of the catalyst is higher than the low-temperature activation temperature, the amount of heat carried away from the catalyst by the air passing through the exhaust gas purification device 81 becomes large, and hence, it is possible to suppress the temperature of the catalyst from rising to an excessive extent at the time of the high-load operation of the internal combustion engine 1 during the fuel cut-off operation or after the end of the fuel cut-off operation. In addition, when the temperature of the catalyst drops to the temperature equal to or lower than the low-temperature determination temperature in the course of the fuel cut-off operation, the amount of heat carried away from the catalyst by the air passing through the exhaust gas purification device 81 becomes small, so the temperature of the catalyst is suppressed from dropping to less than the activation temperature thereof at the time of the low-load operation of the internal combustion engine 1 during the fuel cut-off operation or after the end of the fuel cut-off operation. Accordingly, an excessive temperature rise of the catalyst can be suppressed, while maintaining the catalyst in its activated state.

Hereinbelow, reference will be made to a control procedure for the amount of intake air in the case where the fuel cut-off operation of the internal combustion engine 1 is carried out, in line with FIG. 4. FIG. 4 is a flow chart showing a processing routine which is carried out by means of the ECU 20 in a repeated manner during the operation of the internal combustion engine 1 (e.g., in a period of time in which an ignition switch has been turned on). It is assumed that this processing routine has been stored in the ROM of the ECU 20 in advance. Here, it is assumed that in FIG. 4, Xfc indicates the F/C flag, and Tcat indicates the temperature of the catalyst received in the exhaust gas purification device 81. In addition, it is also assumed that in FIG. 4, Tlow indicates the low-temperature determination temperature, and Ta indicates the activation temperature of the catalyst received in the exhaust gas purification device 81. Moreover, it is assumed that AFcat in FIG. 4 indicates the air fuel ratio of the exhaust gas in the exhaust gas purification device 81.

In the processing routine of FIG. 4, first in the processing of step S101, the ECU 20 reads in the F/C flag Xfc. Subsequently, in the processing of step S102, the ECU 20 determines whether the F/C flag Xfc read in by the processing of step S101 is ON. In cases where a negative determination is made in the processing of step S102 (Xfc=OFF), the ECU 20 ends the execution of this processing routine. In that case, the throttle valve 71 is controlled so that the amount of intake air in the internal combustion engine 1 becomes an amount corresponding to the engine load or the engine rotation speed. On the other hand, in cases where an affirmative determination is made in the processing of step S102 (Xfc=ON), the control routine of the ECU 20 goes to the processing of step S103.

In the processing of step S103, the ECU 20 obtains the temperature Tcat of the catalyst received in the exhaust gas purification device 81. Specifically, the ECU 20 may calculate by estimation the temperature of the catalyst Tcat from the operation history of the internal combustion engine 1, or may substitute a measured value of the exhaust gas temperature sensor 82 for the temperature of the catalyst Tcat. An "obtaining unit" according to the present invention is achieved by carrying out the processing of step S103 by means of the ECU 20.

In the processing of step S104, the ECU 20 obtains the air fuel ratio AFcat of the exhaust gas in the exhaust gas purification device 81. Here, note that the air fuel ratio AFcat of the exhaust gas in the exhaust gas purification device 81 is reflected on the measured value of the air fuel ratio sensor 83, so the measured value of the air fuel ratio sensor 83 may be used as the air fuel ratio AFcat of the exhaust gas in the exhaust gas purification device 81.

In the processing of step S105, the ECU 20 determines whether the temperature Tcat of the catalyst obtained in the above-mentioned processing of step S103 is equal to or lower than the low-temperature determination temperature Tlow. In cases where an affirmative determination is made in the processing of step S105 (Tcat Tlow), the routine of the ECU 20 goes to the processing of step S106.

In the processing of step S106, the ECU 20 determines whether the temperature Tcat of the catalyst obtained in the above-mentioned processing of step S103 is equal to or higher than the activation temperature Ta of the catalyst. In cases where an affirmative determination is made in the processing of step S106 (Tcat≥Ta), the routine of the ECU 20 goes to the processing of step S107.

In the processing of step S107, the ECU 20 determines whether the air fuel ratio AFcat obtained in the above-mentioned processing of step S104 is equal to or lower than the stoichiometric air fuel ratio AFst. That is, the ECU 20 determines whether the interior of the exhaust gas purification device 81 is in a rich atmosphere. Here, note that in an arrangement in which the air fuel ratio sensor 83 is not disposed in the exhaust passage 80 downstream of the exhaust gas purification device 81, the ECU 20 obtains the amount of oxygen which has been supplied to the catalyst from the point in time at which the fuel cut-off operation has been started until the current point in time, by multiplying the concentration of oxygen in the air to the integrated value of the amount of intake air from the start time point of the fuel cut-off operation. Then, the ECU 20 may estimate that the interior of the exhaust gas purification device 81 is in a rich atmosphere, if the amount of oxygen thus obtained is equal to or smaller than the oxygen storage capacity of the catalyst, and that the interior of the exhaust gas purification device 81 is in a lean atmosphere, if the amount of oxygen is larger than the oxygen storage capacity of the catalyst. An "estimation unit" according to the present invention is achieved by carrying out the processing of step S106 by means of the ECU 20.

In cases where an affirmative determination is made in the above-mentioned processing of step S107 (AFcat≤AFst), the current point in time belongs to the above-mentioned rich period of time in FIG. 2, and the catalyst has been activated. Accordingly, the routine of the ECU 20 goes to the processing of step S108, where the throttle valve 71 is controlled in such a manner that the amount of intake air in the internal combustion engine 1 becomes equal to the reaction promotion amount which is larger than the cooling suppression amount. A "correction unit" according to the present invention is achieved by carrying out the processing of step S107 by means of the ECU 20.

In cases where an affirmative determination is made in the above-mentioned processing of step S106 (Tcat<Ta), the catalyst has not been activated. For that reason, even if the current point in time is during the rich period of time, oxidation reaction in the exhaust gas purification device 81 does not substantially occur, resulting in that the heat of the catalyst is carried away by the air passing through the exhaust gas purification device 81. Accordingly, the routine of the ECU 20 goes to the processing of step S109, where the throttle valve 71 is controlled in such a manner that the amount of intake air in the internal combustion engine 1 becomes equal to the cooling suppression amount.

In addition, in cases where a negative determination is made in the above-mentioned processing of step S107 (AFcat>AFst), at the current point in time, the above-mentioned rich period of time has already passed. For that reason, oxidation reaction in the exhaust gas purification device 81 does not substantially occur, resulting in that the heat of the catalyst is carried away by the air passing through the exhaust gas purification device 81. Accordingly, the routine of the ECU 20 goes to the processing of step S109, where the throttle valve 71 is controlled in such a manner that the amount of intake air in the internal combustion engine 1 becomes equal to the cooling suppression amount, as in the case where a negative determination is made in the above-mentioned processing of step S106.

In this manner, by carrying out the processing of step S109 by means of the ECU 20, an "adjustment unit" according to the present invention is achieved.

Moreover, in cases where a negative determination is made in the above-mentioned processing of step S105 (Tcat>Tlow), the routine of the ECU 20 goes to the processing of step S110, where the throttle valve 71 is controlled in such a manner that the amount of intake air in the internal combustion engine 1 becomes equal to the temperature rise suppression amount which is larger than the cooling suppression amount.

When the amount of intake air during the fuel cut-off operation (the amount of air passing through the exhaust gas purification device 81) is controlled by the above-mentioned procedure, even in cases where the fuel cut-off operation of the internal combustion engine 1 is carried out in the state where the temperature of the catalyst is low, the temperature of the catalyst becomes difficult to drop to less than the activation temperature thereof, at the time of the low-load operation of the internal combustion engine during the fuel cut-off operation or after the end of the fuel cut-off operation. As a result, the catalyst can be maintained in its activated state, thus making it possible to suppress the deterioration of exhaust emissions after the end of the fuel cut-off operation.

Here, note that due to the effect of the amount of intake air being adjusted to the reaction promotion amount, the temperature of the catalyst may become higher than the low-temperature determination temperature in the course of the rich period of time. In such a case, when the amount of intake air in the internal combustion engine 1 is controlled according to the processing routine of FIG. 4, the amount of intake air in the internal combustion engine 1 is changed from the reaction promotion amount to the temperature rise suppression amount in the course of the rich period of time. Moreover, when the temperature of the catalyst drops to a temperature equal to or less than the low-temperature determination temperature in the subsequent rich period of time, the amount of intake air in the internal combustion engine 1 is again set to the temperature rise suppression amount.

Here, in the arrangement in which the amount of air passing through the exhaust gas purification device 81 is changed by changing the degree of opening of the throttle valve 71, it takes some time until the change in the degree of opening of the throttle valve 71 is reflected on the amount of air passing through the exhaust gas purification device 81. On the other hand, in cases where the fuel cut-off operation of the internal combustion engine 1 is carried out, the rich period of time in which the interior of the exhaust gas purification device 81 becomes a rich atmosphere is relatively short. Accordingly, even if the degree of opening of the throttle valve 71 is changed during the rich period of time, the rich period of time may end before the change in the degree of opening of the throttle valve 71 is reflected on the amount of air passing through the exhaust gas purification device 81.

Accordingly, in the arrangement in which the amount of air passing through the exhaust gas purification device 81 is adjusted by changing the degree of opening of the throttle valve 71 at the time of the fuel cut-off operation, when the catalyst temperature at the start time point of the fuel cut-off operation is equal to or higher than the activation temperature, and at the same time is equal to or lower than the low-temperature determination temperature, the amount of intake air during the rich period of time may be fixed to the reaction promotion amount.

However, in cases where the amount of air passing through the exhaust gas purification device 81 during the fuel cut-off operation is adjusted by making use of a variable valve operating mechanism, a response delay is smaller than in the case of using the throttle valve 71, and so the amount of air passing through the exhaust gas purification device 81 may be adjusted according to the processing routine of FIG. 4.

Further, in cases where the amount of air passing through the exhaust gas purification device 81 during the fuel cut-off operation is adjusted by making use of a secondary air supply device, too, a response delay is smaller than in the case of using the throttle valve 71, and hence, the amount of air passing through the exhaust gas purification device 81 may also be adjusted according to the processing routine of FIG. 4. Here, note that in the case of using the secondary air supply device, the throttle valve 71 may be controlled in such a manner that the amount of intake air during the period of time of the fuel cut-off operation becomes equal to the cooling suppression amount, whereas when it is necessary to adjust the amount of air passing through the exhaust gas purification device 81 to the temperature rise suppression amount, secondary air may be applied from the secondary air supply device to the exhaust passage 80 upstream of the exhaust gas purification device 81.

Embodiment 2

Next, reference will be made to a second embodiment of the present invention based on FIGS. 5 and 6. Here, a construction different from that of the above-mentioned first embodiment will be described, and an explanation of the same construction will be omitted.

In the above-mentioned first embodiment, there has been described an example in which when the temperature of the catalyst is higher than the low-temperature determination temperature in the period of time of the fuel cut-off operation, the amount of air passing through the exhaust gas purification device 81 is made equal to the temperature rise suppression amount. In contrast to this, in this second embodiment, there will be described an example in which in the rich period of time immediately after the start of the fuel cut-off operation, when the catalyst temperature is equal to or higher than a predetermined high-temperature determination temperature which is higher than the low-temperature determination temperature, the amount of air passing through the exhaust gas purification device 81 is adjusted to an amount smaller than the temperature rise suppression amount.

As described in the above-mentioned first embodiment, when the catalyst has been activated in the rich period of time immediately after the start of the fuel cut-off operation, oxidation reaction is caused to occur by the catalyst, so that the catalyst is heated by the heat of the reaction. At that time, when the temperature of the catalyst in the rich period of time is very high as compared with the low-temperature determination temperature, the catalyst may be caused to rise in temperature to an excessive extent by the heat of the oxidation reaction. In particular, when the amount of air passing through the exhaust gas purification device 81 is made equal to the temperature rise suppression amount during the rich period of time, a relatively large amount of oxidation reaction heat is generated, thus making it easy for the catalyst to rise in temperature to an excessive extent.

In contrast to this, in this second embodiment, in cases where the fuel cut-off operation of the internal combustion engine 1 is carried out in a state where the temperature of the catalyst received in the exhaust gas purification device 81 becomes equal to or higher than the predetermined high-temperature determination temperature, the throttle valve 71 is controlled in the rich period of time immediately after the start of the fuel cut-off operation (i.e., a period of time from t1 to t2 in FIG. 5) in such a manner that the amount of intake air in the internal combustion engine 1 becomes equal to a predetermined reaction suppression amount which is smaller than the amount of intake air after the lapse of the rich period of time (the temperature rise suppression amount), as shown in FIG. 5. Then, in a period of time from the end time point (t2 in FIG. 5) of the rich period of time until the F/C flag is turned off, the throttle valve 71 is controlled so as to make the amount of intake air in the internal combustion engine 1 equal to the temperature rise suppression amount. The "high-temperature determination temperature" referred to herein is a temperature which is considered that when the amount of intake air in the rich period of time is made equal to the temperature rise suppression amount in the state where the temperature of the catalyst is higher than the high-temperature determination temperature, the temperature of the catalyst rises to an excessive extent during the rich period of time. This high-temperature determination temperature is a temperature (e.g., about from 700 to 800 degrees C.) which has been obtained experimentally in advance.

Here, note that the rate of the oxidation reaction occurring in the catalyst during the rich period of time becomes slower (smaller) in accordance with the decreasing amount of oxygen supplied to the catalyst per unit time. For that reason, it is preferable that the amount of intake air during the rich period of time be as small as possible. Accordingly, the "reaction suppression amount" referred to herein is an amount which is smaller than the temperature rise suppression amount, and is desirable to be set to the above-mentioned lower limit value (the minimum amount of intake air in which the amount of oil sucked into a cylinder 2 due to an increase of negative pressure in the cylinder 2 accompanying a decrease in the amount of intake air falls below the permissible amount), or an amount equal to a sum of the lower limit value and a predetermined margin.

In the case where the amount of air passing through the exhaust gas purification device 81 is made equal to the reaction suppression amount during the rich period of time, the amount of oxygen flowing into the exhaust gas purification device 81 per unit time becomes smaller, in comparison with the case where the amount of air passing through the exhaust gas purification device 81 is made equal to the temperature rise suppression amount. As the amount of oxygen flowing into the exhaust gas purification device 81 per unit time decreases, the amount of oxidation reaction heat generated per unit time also decreases. As a result, the carrying away of heat by the air passing through the catalyst becomes prevalent with respect to the heating of the catalyst by the heat of oxidation reaction, so that the amount of rise in the temperature of the catalyst during the rich period of time decreases. Consequently, the catalyst becomes difficult to rise excessively in temperature during the rich period of time.

Hereinbelow, reference will be made to a control procedure for the amount of intake air in the case where the fuel cut-off operation of the internal combustion engine 1 is carried out, in line with FIG. 6. FIG. 6 is a flow chart showing a processing routine which is carried out repeatedly by the ECU 20 during the operation of the internal combustion engine 1. In the processing routine of FIG. 6, the same symbols are attached to the same processes as those in the above-mentioned processing routine of FIG. 4. Here, it is assumed that Thigh in FIG. 6 indicates the high-temperature determination temperature.

The difference of the processing routine in FIG. 6 from the processing routine in FIG. 4 is in the processings which are carried out, in cases where a negative determination is made in the processing of step S105 (Tcat>Tlow). Accordingly, in the following, among the processings of the processing routine in FIG. 6, those which are different from the above-mentioned processings in FIG. 4 will be described, and an explanation of the same processings will be omitted.

In cases where an affirmative determination is made in the processing of step S105, the routine of the ECU 20 goes to the processing of step S201, where it is determined whether the temperature Tcat of the catalyst obtained in the processing of step S103 is equal to or higher than the predetermined high-temperature determination temperature Thigh. In cases where a negative determination is made in the processing of step S201 (Tcat<Thigh), the routine of the ECU 20 goes to the processing of step S110, where the throttle valve 71 is controlled in such a manner that the amount of intake air in the internal combustion engine 1 becomes equal to the temperature rise suppression amount.

On the other hand, in cases where an affirmative determination is made in the above-mentioned processing of step S201 (Tcat≥Thigh), the routine of the ECU 20 goes to the processing of step S202. In the processing of step S202, the ECU 20 determines whether the air fuel ratio AFcat obtained in the processing of step S104 is equal to or lower than the stoichiometric air fuel ratio AFst.

In cases where an affirmative determination is made in the above-mentioned processing of step S202 (AFcat≤AFst), the current point in time belongs to the above-mentioned rich period of time in FIG. 5. Accordingly, the routine of the ECU 20 goes to the processing of step S203, where the throttle valve 71 is controlled in such a manner that the amount of intake air in the internal combustion engine 1 becomes equal to the reaction suppression amount which is smaller than the temperature rise suppression amount.

On the other hand, in cases where a negative determination is made in the above-mentioned processing of step S202 (AFcat>AFst), at the current point in time, the above-mentioned rich period of time has already passed. Accordingly, the routine of the ECU 20 goes to the processing of step S110, where the throttle valve 71 is controlled in such a manner that the amount of intake air in the internal combustion engine 1 becomes equal to the temperature rise suppression amount.

When the amount of intake air during the fuel cut-off operation (the amount of air passing through the exhaust gas purification device 81) is controlled by the above-mentioned procedure, in cases where the fuel cut-off operation of the internal combustion engine 1 is carried out in a state where the temperature of the catalyst is low, the same effects or advantages as those in the above-mentioned first embodiment can be obtained. In addition, in cases where the fuel cut-off operation of the internal combustion engine is carried out in a state where the temperature of the catalyst is very high, the catalyst becomes difficult to rise excessively in temperature during the rich period of time, so that the thermal deterioration of the catalyst can be suppressed.

Here, note that due to the effect of the amount of intake air being adjusted to the reaction suppression amount, the temperature of the catalyst may drop to less than the high-temperature determination temperature in the course of the rich period of time. In such a case, when the amount of intake air in the internal combustion engine 1 is controlled according to the processing routine of FIG. 6, the amount of intake air in the internal combustion engine 1 is changed from the reaction suppression amount to the temperature rise suppression amount in the course of the rich period of time. Moreover, when the temperature of the catalyst rises to a temperature equal to or higher than the high-temperature determination temperature in the subsequent rich period of time, the amount of intake air in the internal combustion engine 1 is again changed to the reaction suppression amount.

Here, as described in the above-mentioned first embodiment, in the arrangement in which the amount of air passing through the exhaust gas purification device 81 is changed by changing the degree of opening of the throttle valve 71, even if the degree of opening of the throttle valve 71 is changed during the rich period of time, the rich period of time may end before the change in the degree of opening of the throttle valve 71 is reflected on the amount of air passing through the exhaust gas purification device 81.

Accordingly, in the arrangement in which the amount of air passing through the exhaust gas purification device 81 is adjusted by changing the degree of opening of the throttle valve 71 at the time of the fuel cut-off operation, when the catalyst temperature at the start time point of the fuel cut-off operation is equal to or higher than the high-temperature determination temperature, the amount of intake air during the rich period of time may be fixed to the reaction suppression amount.

However, in cases where the amount of air passing through the exhaust gas purification device 81 during the fuel cut-off operation is adjusted by making use of a variable valve operating mechanism, a response delay is smaller than in the case of using the throttle valve 71, and so the amount of air passing through the exhaust gas purification device 81 may be adjusted according to the processing routine of FIG. 6.

Further, in cases where the amount of air passing through the exhaust gas purification device 81 during the fuel cut-off operation is adjusted by making use of a secondary air supply device, too, a response delay is smaller than in the case of using the throttle valve 71, and hence, the amount of air passing through the exhaust gas purification device 81 may also be adjusted according to the processing routine of FIG. 6.

REFERENCE SIGNS LIST

1 internal combustion engine
2 cylinder
5 fuel injection valve
6 spark plug
7 intake port
8 exhaust port
11 water temperature sensor
20 ECU
70 intake passage
71 throttle valve
72 air flow meter
80 exhaust passage
81 exhaust gas purification device
82 exhaust gas temperature sensor
83 air fuel ratio sensor

What is claimed is:

1. A control apparatus for an internal combustion engine in which in an exhaust passage, there is disposed a catalyst having an oxygen storage ability in which oxygen is stored when an air fuel ratio of exhaust gas is a lean air fuel ratio higher than a stoichiometric air fuel ratio, whereas oxygen is released when the air fuel ratio of exhaust gas is a rich air fuel ratio lower than the stoichiometric air fuel ratio, the control apparatus comprising:
a controller comprising at least one processor configured to:
estimate the air fuel ratio of the exhaust gas in said catalyst;
obtain a temperature of said catalyst;
adjust an amount of air passing through said catalyst to a predetermined cooling suppression amount that minimizes cooling of the catalyst, when the obtained temperature is equal to or less than a predetermined low-temperature determination temperature which is higher than an activation temperature of said catalyst, in a period of time in which the internal combustion engine is driven in a fuel cut-off operation; and
change the amount of air passing through said catalyst to more than said cooling suppression amount, when the obtained temperature is equal to or higher than the activation temperature of said catalyst, during a period of time from a point in time at which the fuel cut-off operation is started until a point in time at which the estimated air fuel ratio changes from an air fuel ratio equal to or less than the stoichiometric air fuel ratio to a lean air fuel ratio, in a period of time in which the amount of air passing through said catalyst is adjusted to the cooling suppression amount, wherein
the controller adjusts the amount of air passing through the catalyst to a predetermined temperature rise suppression amount which is larger than the cooling suppression amount, when the obtained temperature is equal to or higher than a predetermined high-temperature determination temperature which is higher than the low-temperature determination temperature, in the period of time in which the internal combustion engine is driven in the fuel cut-off operation, and decreases the amount of air passing through the catalyst from the temperature rise suppression amount, when the obtained temperature is equal to or higher than the predetermined high-temperature determination temperature which is higher than the low-temperature determination temperature, during the period of time from the point in time at which the fuel cut-off operation is started until the point in time at which the estimated air fuel ratio changes from the air fuel ratio equal to or less than the stoichiometric air fuel ratio to the lean air fuel ratio, in the case where the amount of air passing through the catalyst is adjusted to the temperature rise suppression amount.

2. The control apparatus for an internal combustion engine as set forth in claim 1,
the control apparatus further comprising:
a measuring device that is disposed in the exhaust passage at a location downstream of the catalyst for measuring a physical quantity correlated with the air fuel ratio of the exhaust gas,
wherein the controller estimates the air fuel ratio of the exhaust gas inside the catalyst, by assuming that the air fuel ratio measured by the measuring device is equal to the air fuel ratio of the exhaust gas inside the catalyst.

3. A control apparatus for an internal combustion engine in which in an exhaust passage, there is disposed a catalyst having an oxygen storage ability in which oxygen is stored when an air fuel ratio of exhaust gas is a lean air fuel ratio higher than a stoichiometric air fuel ratio, whereas oxygen is released when the air fuel ratio of exhaust gas is a rich air fuel ratio lower than the stoichiometric air fuel ratio, comprising:
an air-fuel ratio sensor configured to estimate the air fuel ratio of the exhaust gas in said catalyst;
a temperature sensor configured to obtain a temperature of said catalyst;
a throttle valve disposed in an intake passage;
a controller comprising at least one processor configured to control the throttle valve to:

adjust an amount of air passing through said catalyst to a predetermined cooling suppression amount that minimizes cooling of the catalyst, when the obtained temperature is equal to or less than a predetermined low-temperature determination temperature which is higher than an activation temperature of said catalyst, in a period of time in which the internal combustion engine is driven in a fuel cut-off operation; and change the amount of air passing through said catalyst to more than said cooling suppression amount, when the obtained temperature is equal to or higher than the activation temperature of said catalyst, during a period of time from a point in time at which the fuel cut-off operation is started until a point in time at which the estimated air fuel ratio changes from an air fuel ratio equal to or less than the stoichiometric air fuel ratio to a lean air fuel ratio, in a period of time in which the amount of air passing through said catalyst is adjusted to the cooling suppression amount, wherein the controller adjusts the amount of air passing through the catalyst to a predetermined temperature rise suppression amount which is larger than the cooling suppression amount, when the obtained temperature is equal to or higher than a predetermined high-temperature determination temperature which is higher than the low-temperature determination temperature, in the period of time in which the internal combustion engine is driven in the fuel cut-off operation, and decreases the amount of air passing through the catalyst from the temperature rise suppression amount, when the obtained temperature is equal to or higher than the predetermined high-temperature determination temperature which is higher than the low-temperature determination temperature, during the period of time from the point in time at which the fuel cut-off operation is started until the point in time at which the estimated air fuel ratio changes from the air fuel ratio equal to or less than the stoichiometric air fuel ratio to the lean air fuel ratio, in the case where the amount of air passing through the catalyst is adjusted to the temperature rise suppression amount.

* * * * *